(12) United States Patent
Yoshio et al.

(10) Patent No.: US 8,266,174 B2
(45) Date of Patent: Sep. 11, 2012

(54) BEHAVIOR HISTORY RETRIEVAL APPARATUS AND BEHAVIOR HISTORY RETRIEVAL METHOD

(75) Inventors: Hiroaki Yoshio, Kanagawa (JP); Shoichi Araki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 12/526,508

(22) PCT Filed: Feb. 12, 2008

(86) PCT No.: PCT/JP2008/000207
§ 371 (c)(1),
(2), (4) Date: Aug. 8, 2009

(87) PCT Pub. No.: WO2008/102526
PCT Pub. Date: Aug. 28, 2008

(65) Prior Publication Data
US 2010/0318566 A1 Dec. 16, 2010

(30) Foreign Application Priority Data
Feb. 19, 2007 (JP) ................... 2007-038145

(51) Int. Cl.
*G06F 17/30* (2006.01)

(52) U.S. Cl. ........................ 707/780; 382/118

(58) Field of Classification Search ............... 382/115, 382/118
See application file for complete search history.

(56) References Cited

U.S. PATENT DOCUMENTS

| 2006/0126906 A1* | 6/2006 | Sato et al. ............... 382/118 |
| 2007/0122011 A1* | 5/2007 | Takizawa ............... 382/118 |
| 2007/0189585 A1* | 8/2007 | Sukegawa et al. ......... 382/118 |

FOREIGN PATENT DOCUMENTS

| JP | 2001-075976 A | 3/2001 |
| JP | 2004-038706 A | 2/2004 |
| JP | 2004-102697 A | 4/2004 |
| JP | 2005-100090 A | 4/2005 |
| JP | 2006-115011 A | 4/2006 |
| JP | 2006-178516 A | 7/2006 |
| JP | 2006-236183 A | 9/2006 |

OTHER PUBLICATIONS

International Search Report for PCT/JP2008/000207.

(Continued)

*Primary Examiner* — Rehana Perveen
*Assistant Examiner* — Alexander Khong
(74) *Attorney, Agent, or Firm* — Pearne & Gordon LLP

(57) ABSTRACT

A meta classification section assigns the degree of accuracy capable of identifying an individual to person feature information containing a face, color, shape, etc., and person passage information and stores the metadata of the person feature information and the person passage information for each degree of accuracy, a discrete retrieval section retrieves the person to be retrieved in the high accuracy metadata stored by the meta classification section, a dependence determination section determines a person having a dependence on the person to be retrieved using a plurality of retrieval results hit in the discrete retrieval and the high accuracy metadata, a query generation section regenerates a retrieval key from the identifier of the person having a dependence and the identifier of the person to be retrieved, and a discrete candidate-to-candidate retrieval section retrieves the person corresponding to the regenerated retrieval key in the low accuracy metadata.

12 Claims, 11 Drawing Sheets

OTHER PUBLICATIONS

European Search Report for 08710361.0-1527 / 2113846 dated Mar. 22, 2012.

Prati A. et al; "An integrated multi-modal sensor network for video surveillance"; Proceedings of the ACM International Workshop on Videosurveillance and Sensor Networks; Nov. 11, 2005; pp. 95-102; XP0022472284.

Khan S. et al; "Consistent Labeling of Tracked Objects in Multiple Cameras With Overlapping Fields of View"; IEEE Transactions on Pattern Analysis and Machine Intelligence; IEEE Service Center; Los Alamitos, CA, USA; vol. 25, No. 10; Oct. 1, 2003; pp. 1355-1360, XP001185270; ISSN: 0162-8828, DOI: 10.1109/TPAMI.2003.1233912.

* cited by examiner

FIG. 4

|  | META CLASSIFICATION PATTERN A | | | META CLASSIFICATION PATTERN B | | | META CLASSIFICATION PATTERN B | | |
|---|---|---|---|---|---|---|---|---|---|
|  | DETECTED METADATA | HIGH AC-CURACY META | LOW AC-CURACY META | DETECTED METADATA | HIGH AC-CURACY META | LOW AC-CURACY META | DETECTED METADATA | HIGH AC-CURACY META | LOW AC-CURACY META |
| READER 12-1 | PERSON PASSAGE INFORMATION | ○ | — | PERSON PASSAGE INFORMATION (FACE DATA EXISTS IN READER) | ○ | — | READER NOT USED | — | — |
| READER 12-2 |  | ○ | — |  | ○ | — |  | — | — |
| READER 12-3 |  | ○ | — |  | ○ | — |  | — | — |
| CAMERA 11-1 | FACE + COLOR FEATURE DATA | FACE | COLOR | FACE + COLOR FEATURE DATA | — | ○ | FACE + COLOR FEATURE DATA | FACE | COLOR |
| CAMERA 11-2 |  | FACE | COLOR |  | — | ○ |  | FACE | COLOR |
| CAMERA 11-5 |  | FACE | COLOR |  | — | ○ |  | FACE | COLOR |
| CAMERA 11-3 | COLOR FEATURE DATA | — | COLOR |  | — | ○ |  | FACE | COLOR |
| CAMERA 11-4 |  | — | COLOR |  | — | ○ |  | FACE | COLOR |

FIG. 6

| PERSON TO BE RETRIEVED | FIRST PASSAGE INFORMATION 15.00. READER (1) | SECOND PASSAGE INFORMATION 15.01. READER (2) | THIRD PASSAGE INFORMATION 15.03. READER (5) | FOURTH PASSAGE INFORMATION 15.04. READER (6) | FIFTH PASSAGE INFORMATION 15.07. READER (3) | SIXTH PASSAGE INFORMATION 15.08. READER (1) | SEVENTH PASSAGE INFORMATION 15.10. READER (0) |
|---|---|---|---|---|---|---|---|
| PERSON B TIME AXIS LIST | | ○ | ○ | ○ | | | |
| PERSON C TIME AXIS LIST | | | | | ○ | ○ | ○ |
| PERSON D TIME AXIS LIST | ○ | | ○ | | | | ○ |

○ : ELEMENT OF TIME AXIS LIST

FIG. 7

ADDITIONAL QUERY LIST

| PERSON B | START = 15:01 | END = 15:04 |
|---|---|---|
| PERSON C | START = 15:07 | END = 15:10 |
| PERSON D | START = 15:00 | END = 15:03 |
| PERSON D | START = 15:10 | END = 15:10 |

FIG. 8

REGENERATED QUERY LIST

| PERSON IDENTIFIER | TIME | AREA |
|---|---|---|
| PERSON A OR D | 15:00-15:01 | CAMERA ON PERIPHERY OF READER (1, 2) |
| PERSON A OR B OR D | 15:01-15:03 | CAMERA ON PERIPHERY OF READER (2, 5) |
| PERSON A OR B | 15:03-15:04 | CAMERA ON PERIPHERY OF READER (5, 6) |
| PERSON A | 15:04-15:07 | CAMERA ON PERIPHERY OF READER (6, 3) |
| PERSON A OR C | 15:07-15:10 | CAMERA ON PERIPHERY OF READER (3, 1, 0) |

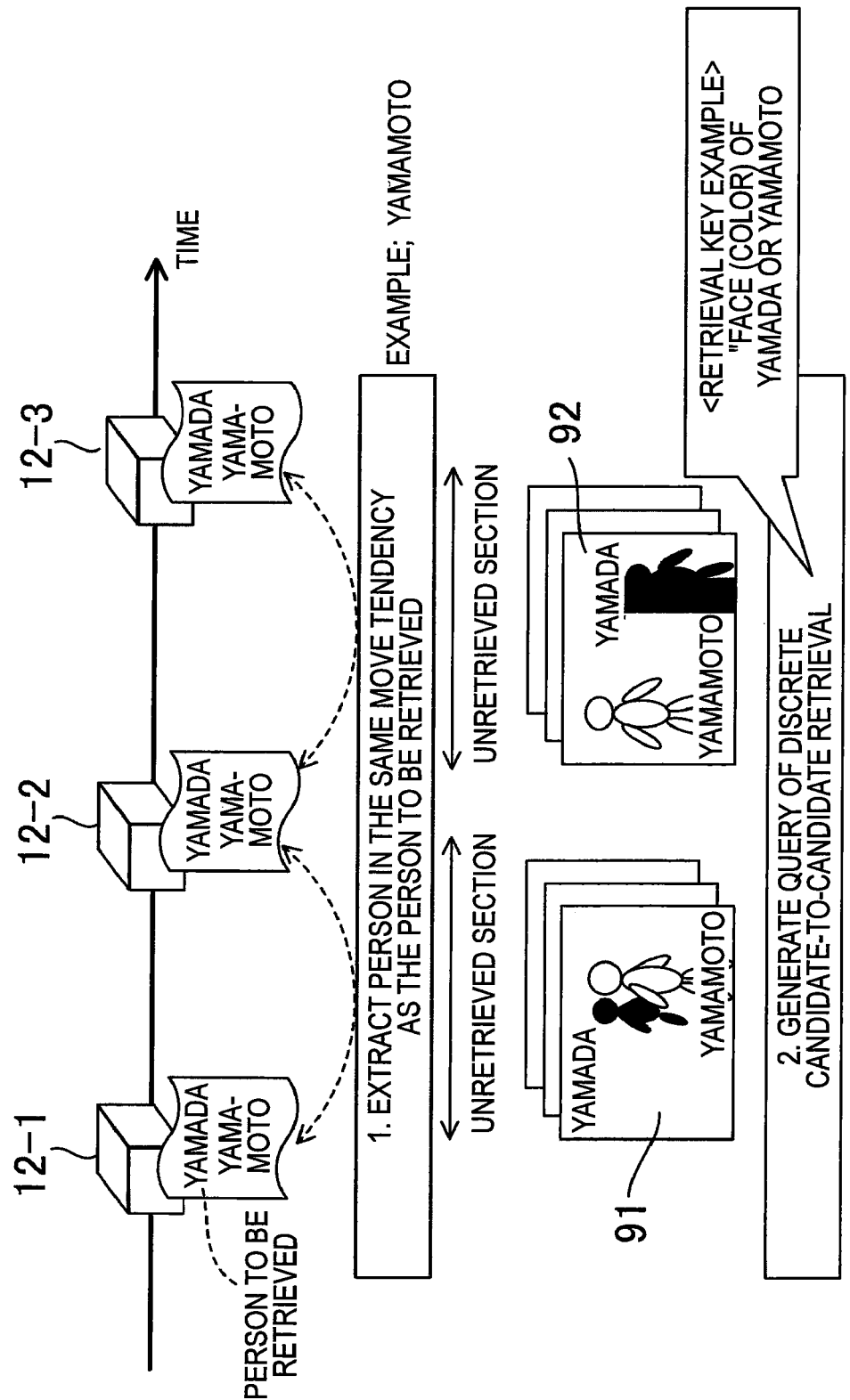

FIG. 11

ACCURACY LEVEL TABLE

| ACCURACY LEVEL | | APPLIED META |
|---|---|---|
| HIGH | 1 | RF-ID/IC CARD: FACE DETECTED DURING T SECONDS AFTER ENTRANCE |
| | 2 | RF-ID/IC CARD: COLOR DETECTED DURING T SECONDS AFTER ENTRANCE |
| | 3 | RF-ID/IC CARD: NOTHING DETECTED DURING T SECONDS AFTER ENTRANCE |
| MEDIUM | | FACE |
| LOW | | COLOR |

BEHAVIOR HISTORY RETRIEVAL APPARATUS AND BEHAVIOR HISTORY RETRIEVAL METHOD

TECHNICAL FIELD

This invention relates to a behavior history retrieval apparatus and a behavior history retrieval method for extracting a behavior history of a specific person of a suspect, a lost person, etc., by using person features of a face, color, shape, etc., extracted from camera images of a plurality of cameras.

BACKGROUND ART

In recent years, a master video monitoring system having cameras, sensors, storage, etc., installed for preventing a crime has become drastically widespread with an increase in crimes represented by picking, a robbery, arson, etc. A system for performing wide-area monitoring and long-hour recording of several hundred points has also increased with adopting of IP (Internet Protocol) for a surveillance camera and a larger capacity of storage of a hard disk drive, etc. Under such circumstances, there is a demand for a technique for efficiently investigating a specific person of a shoplifter, a lost person, a person losing an article, etc., for lightening work of a guardian.

A method of previously storing feature data (faces, colors, shapes, etc.,) of an unspecified number of the general public extracted from camera images in a database and extracting and displaying a person matching the feature data of the person to be retrieved from the database exists as a related art of investigating a specific person (person to be retrieved) at high speed. However, the tendency of the feature data of the extracted person varies depending on the image pickup condition (lighting, angle of view, orientation and size of person) and thus a threshold value of matching processing (boundary value between the person in question and a different person) must be adjusted by taking into account the photographing condition of each camera at the retrieving time and there is a problem in that it takes time until any desired result is provided. That is, the user must perform repetitive operation such that if the threshold value is set to a low value, erroneous detection increases and if the threshold value is set to a high value, undetected errors increase; efficiency is very poor.

On the other hand, an art of improving the retrieval accuracy using a plurality of feature amounts in combination is proposed as a related art for solving the problem described above (for example, refer to patent document 1, patent document 2, or patent document 3). Patent document 1 describes a technique of managing the feature data of a person in moving image units (time series data units) rather than still image units, thereby suppressing temporary variation of the feature data of the person for improving the retrieval accuracy, and patent document 2 describes a technique of automatically correcting the retrieval condition using a manually given keyword and manually given person feature data in combination. Patent document 3 describes a technique of using RFID (Radio Frequency Identification) and person feature data in combination for improving detection/retrieval accuracy of an unauthorized passerby.

Patent document 1: Japanese Patent Laid-Open No. 2006-178516
Patent document 2: Japanese Patent Laid-Open No. 2005-100090
Patent document 3: Japanese Patent Laid-Open No. 2006-236183

DISCLOSURE OF THE INVENTION

Problems to be Solved by the Invention

However, the related arts disclosed in the patent documents described above make it possible to improve the detection accuracy/narrowing-down speed by using time series, highly reliable keyword/RFID, and person feature data in combination; however, there is a problem in that a behavior history cannot be extracted in a time period in which a part of the person to be retrieved is hidden in a blind spot or in the shade of another person.

The invention is embodied considering the circumstances and it is an object of the invention to provide a behavior history retrieval apparatus and a behavior history retrieval method that can also investigate a behavior history in a time period in which a part of the person to be retrieved is hidden in a blind spot or in the shade of another person in the environment in which an unspecified number of the general public behave.

Means For Solving the Problems

A behavior history retrieval apparatus of the invention includes a plurality of cameras for extracting the features containing the face, color, and shape of a person and a plurality of readers for detecting passage of a person and extracts a behavior history of a specific person with the cameras and the readers installed in a building or on a street corner. The behavior history retrieval apparatus includes a plurality of databases provided in response to the difference in the degree of accuracy capable of identifying an individual, meta classification means for assigning the degree of accuracy capable of identifying an individual to the person feature information of a person extracted from the cameras and the passage information of a person detected through the readers and storing in the database corresponding to the assigned accuracy level, retrieval request reception means for receiving an identifier for identifying a person to be retrieved at least as a retrieval key, discrete retrieval means for retrieving the person corresponding to the retrieval key received by the retrieval request reception means in the high accuracy database of the plurality of databases, dependence determination means for determining a person having a dependence on the person to be retrieved using a plurality of retrieval results hit in the discrete retrieval means and the high accuracy database, query generation means for generating a retrieval key from the identifier of the person having a dependence, determined by the dependence determination means and the identifier of the person to be retrieved, and discrete candidate-to-candidate retrieval means for retrieving the person corresponding to the retrieval key generated by the query generation means in the low accuracy database of the plurality of databases.

According to this configuration, the person having a dependence on the person to be retrieved can be automatically determined and can be given to a retrieval quest for executing retrieval, so that the behavior history can also be investigated in a time period in which a part of the person to be retrieved is hidden in a blind spot or in the shade of another person.

In the configuration described above, the meta classification means classifies the metadata of the person feature information and the person passage information into a plurality of degrees of accuracy in the descending order of the authentication accuracy of the false non-match rate and the false acceptance rate and generates metadata for each degree of accuracy.

According to this configuration, high accuracy metadata can be set in response to the camera installation condition and the presence or absence of a reader; for example, in a system using no reader, the person feature data of a face can be set in high accuracy metadata for executing discrete retrieval or if a reader is used, the person feature data of a face and the person passage information can be set in high accuracy metadata for increasing the number of candidates hit in discrete retrieval.

In the configuration described above, the meta classification means subdivides the level of the metadata classified into the high accuracy database in response to the association with any other metadata and specifies the metadata corresponding to the subdivided level at the retrieval condition specifying time of discrete candidate-to-candidate retrieval.

According to this configuration, the retrieval hit rate at the time of discrete candidate retrieval can be enhanced and the whole processing time can be shortened.

In the configuration described above, the discrete candidate-to-candidate retrieval means repeatedly executes discrete candidate-to-candidate retrieval in order from the high accuracy database.

According to this configuration, the retrieval processing can be speeded up.

In the configuration described above, the dependence determination means extracts the person passing at the same time as the person to be retrieved from the high accuracy database and determines that a person moving in a pair with the person to be retrieved for a given time is the dependence person.

According to this configuration, the behavior history can also be investigated if a part of the person to be retrieved is hidden in a blind spot or in the shade of another person in a time period in which the person to be retrieved is together with a visitor, a companion, a parent, etc.

In the configuration described above, the dependence determination means extracts a person passing in a predetermined time difference from the person to be retrieved from the high accuracy database and determines that a person in the same move tendency as the person to be retrieved for a given time is the dependence person.

According to this configuration, the behavior history can also be investigated if a part of the person to be retrieved is hidden in a blind spot or in the shade of another person in a time period in which a follower exists although the person to be retrieved is alone.

A behavior history retrieval method of the invention includes a meta classification step of assigning the degree of accuracy capable of identifying an individual to person feature information containing a face, color, and shape and person passage information and storing the metadata of the person feature information and the person passage information for each degree of accuracy, a discrete retrieval step of retrieving the person to be retrieved in the high accuracy metadata stored in the meta classification step, a dependence determination step of determining a person having a dependence on the person to be retrieved using a plurality of retrieval results hit in the discrete retrieval step and the high accuracy metadata, a query generation step of generating a retrieval key from the identifier of the person having a dependence, determined in the dependence determination step and the identifier of the person to be retrieved, and a discrete candidate-to-candidate retrieval step of retrieving the person corresponding to the retrieval key generated in the query generation step in the low accuracy metadata.

According to this method, the person having a dependence on the person to be retrieved can be automatically determined and can be given to a retrieval quest for executing retrieval, so that the behavior history can also be investigated in a time period in which a part of the person to be retrieved is hidden in a blind spot or in the shade of another person.

In the method described above, in the meta classification step, the metadata of the person feature information and the person passage information is classified into a plurality of degrees of accuracy in the descending order of the authentication accuracy of the false non-match rate and the false acceptance rate and metadata is generated for each degree of accuracy.

According to this method, high accuracy metadata can be set in response to the camera installation condition to provide the person feature information containing the face, color, and shape and the presence or absence of a reader to provide the person passage information; for example, in a system using no reader, the person feature data of a face can be set in high accuracy metadata for executing discrete retrieval or if a reader is used, the person feature data of a face and the person passage information can be set in high accuracy metadata for increasing the number of candidates hit in discrete retrieval.

In the method described above, in the meta classification step, the level of the high accuracy metadata is subdivided in response to the association with any other metadata and the metadata corresponding to the subdivided level is specified at the retrieval condition specifying time of discrete candidate-to-candidate retrieval.

According to this method, the retrieval hit rate at the time of discrete candidate retrieval can be enhanced and the whole processing time can be shortened.

In the method described above, in the discrete candidate-to-candidate retrieval step, repeatedly executes discrete candidate-to-candidate retrieval in order from the high accuracy database.

According to this method, the retrieval processing can be speeded up.

In the method described above, in the dependence determination step, the person passing at the same time as the person to be retrieved is extracted from the accurate metadata and a person moving in a pair with the person to be retrieved for a given time is determined the dependence person.

According to this method, the behavior history can also be investigated if a part of the person to be retrieved is hidden in a blind spot or in the shade of another person in a time period in which the person to be retrieved is together with a visitor, a companion, a parent, etc.

In the method described above, in the dependence determination step, a person passing in a predetermined time difference from the person to be retrieved is extracted from the high accuracy metadata and a person in the same move tendency as the person to be retrieved for a given time is determined the dependence person.

According to this method, the behavior history can also be investigated if a part of the person to be retrieved is hidden in a blind spot or in the shade of another person in a time period in which a follower exists although the person to be retrieved is alone.

Advantages of the Invention

The invention can also investigate the behavior history in the time period in which a part of the person to be retrieved is

BRIEF DESCRIPTION OF THE DRAWINGS

FIG. 4 is a drawing to describe meta classification of the behavior history retrieval apparatus according to embodiment 1 of the invention.

FIG. 6 is a drawing to describe the details of the retrieval operation of the behavior history retrieval apparatus according to embodiment 1 of the invention.

FIG. 7 is a drawing to describe the details of the retrieval operation of the behavior history retrieval apparatus according to embodiment 1 of the invention.

FIG. 8 is a drawing to describe the details of the retrieval operation of the behavior history retrieval apparatus according to embodiment 1 of the invention.

FIG. 9 is an image drawing to show a retrieval execution example of the behavior history retrieval apparatus according to embodiment 1 of the invention.

FIG. 11 is a drawing to describe meta classification of a behavior history retrieval apparatus according to embodiment 3 of the invention.

DESCRIPTION OF REFERENCE NUMERALS

Figure 1:
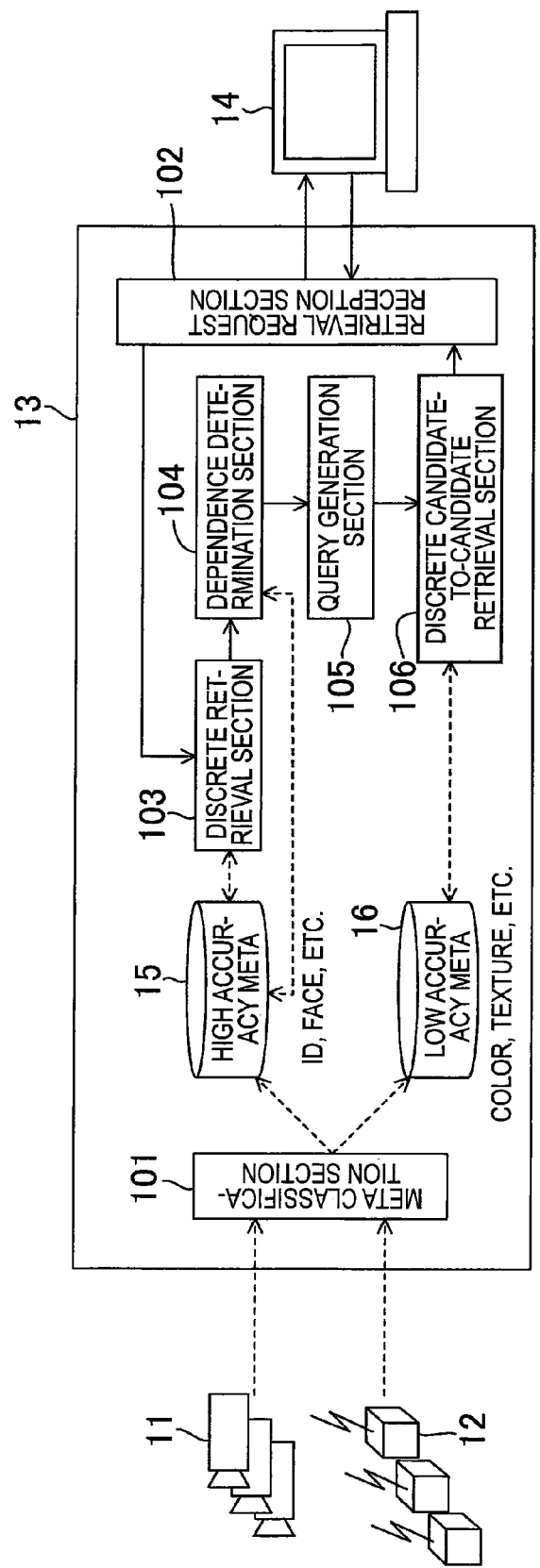
FIG. 1 is a block diagram to show the schematic configuration of a behavior history retrieval apparatus according to embodiment 1 of the invention.

11 Camera
12 Reader
13 Meta storage server
14 Retrieval terminal
15, 16 Database
101 Meta classification section
102 Retrieval request reception section
103 Discrete retrieval section
104 Dependence determination section
105 Query generation section
106 Discrete candidate-to-candidate retrieval section

BEST MODE FOR CARRYING OUT THE INVENTION

Preferred embodiments for carrying out the invention will be discussed in detail with reference to the accompanying drawings.

Embodiment 1

FIG. 1 is a block diagram to show the schematic configuration of a behavior history retrieval apparatus according to embodiment 1 of the invention. In FIG. 1, the behavior history retrieval apparatus according to the embodiment is made up of a plurality of cameras 11 for detecting a person, readers 12 for detecting the passage of a person, a meta storage server 13 for retrieving a person meeting the specified retrieval condition, a retrieval terminal 14 for specifying a retrieval condition for the meta storage server 13 and executing retrieval, and databases 15 and 16 for storing person information detected by the camera 11 and the reader 12.

The meta storage server 13 includes a meta classification section 101, a retrieval request reception section 102, a discrete retrieval section 103, a dependence determination section 104, a query generation section 105, and a discrete candidate-to-candidate retrieval section 106. The meta classification section 101 assigns an individual identifiable level (degree of accuracy) to the feature data of a person extracted from camera images of the cameras 11 (person feature information of a face, color, shape, etc.,) and the passage information of a person detected through the readers 12 and stores the person feature data and the person passage information in the database 15 or 16 for each degree of accuracy. The retrieval request reception section 102 receives an identifier for identifying the person to be retrieved at least as a retrieval key. In this case, the identifier for identifying the person to be retrieved is transmitted from the retrieval terminal 14. The discrete retrieval section 103 retrieves the person corresponding to the retrieval key received by the retrieval request reception section 102 in the high accuracy database 15.

The dependence determination section 104 determines a person (dependence person) having a dependence on the person to be retrieved using a plurality of retrieval results hit in the discrete retrieval section 103 and the high accuracy database 15. The query generation section 105 generates a retrieval key from the identifier of the person having a dependence on the person to be retrieved, determined by the dependence determination section 104 and the identifier of the person to be retrieved. The discrete candidate-to-candidate retrieval section 106 retrieves the person corresponding to the retrieval key generated by the query generation section 105 in the low accuracy database 16.

The person feature data extracted from the camera images of the cameras 11 is image data of a movable body cut out from the images or is information for determining the movable body according to the shape, color, size, motion, etc., or is information for determining the shapes, positions, etc., of the eyes, nose, and mouth of a face. An extraction classification method of the feature information is widely known and is strictly described in "Image Recognition Processing" (cowritten by YASUIIN Takishi and NAGAO Tomoharu, Shoukoudou Shuppan), for example. The already existing technologies make it possible to identify a person from a camera image and extract the features of the face, the dress color, etc., of the person. Although the description has been given using the configuration of extracting the person feature data with the cameras 11, a configuration of extracting the person feature data with a recorder, etc., for storing and redistributing a plurality of camera images may be adopted.

Figure 2:
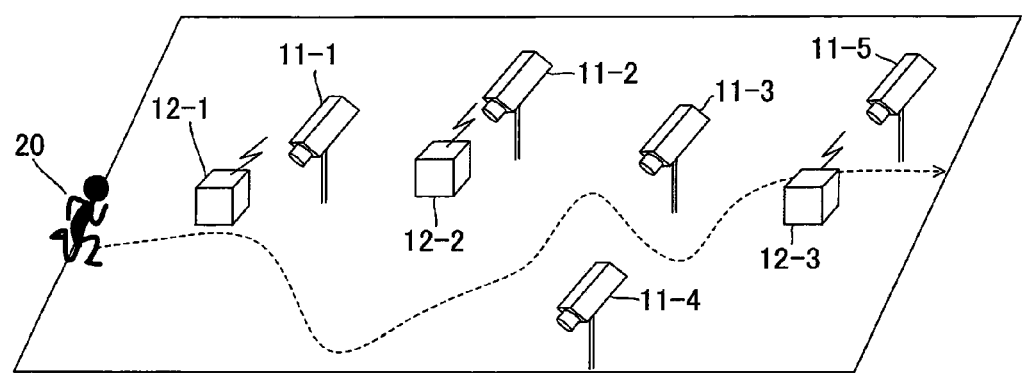
FIG. 2 is an installation image drawing of cameras and readers of the behavior history retrieval apparatus according to embodiment 1 of the invention.
Figure 3:
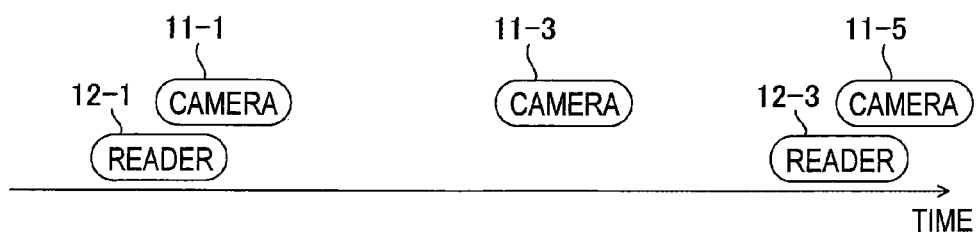
FIG. 3 is a drawing to describe meta data detection of the behavior history retrieval apparatus according to embodiment 1 of the invention.

FIG. 2 schematically represents an installation example of the cameras 11 and the readers 12; it shows an example of installing five cameras (in FIG. 2, cameras 11-1 to 11-5) and three readers 12 (in FIG. 2, readers 12-1 to 12-3) in a living room area. When a person (in FIG. 2, Yamada) 20 passes, metadata of the person feature data (face, color, shape, etc.,) and person move information of Yamada is detected and is transmitted to the meta storage server 13. FIG. 3 shows an example wherein detection operates with the passage of Yamada; detection operates in the order of "reader 12-1->camera 11-1->camera 11-3->reader 12-3->camera 11-5" and the detected metadata is transmitted to the meta storage server 13 in sequence.

FIG. 4 shows a classification example of the meta classification section 101; metadata can be classified according to any method of the following classification patterns A, B, and C depending on the descriptions of the metadata output by the readers 12-1 to 12-3 and the cameras 11-1 to 11-5:

<Meta Classification Pattern A>

Using RFID readers, IC card readers, etc., as the readers 12-1 to 12-3, the passage of the person 20 is detected and passage information "name, time, reader name (location)" is output as metadata. The cameras 11-1, 11-2, and 11-5 are installed as cameras for detecting the face feature data of the person and the color/shape feature data of the dress, the cameras 11-3 and 11-4 are installed as cameras for detecting the color/shape of the dress of the person, and when the person is detected, person feature data "face feature data (or color/shape feature data of dress), time, camera name (location)" is output as metadata.

The person detected with the readers 12-1 to 12-3 and the cameras 11-1 to 11-5 can be tied using "name" among the readers 12-1 to 12-3. It can be tied by similarity calculation using "face feature data or color/shape feature data of dress" among the cameras 11-1 to 11-5. Mutual detected metadata can be tied using time/location correlation between "reader 12-1 and camera 11-1," between "reader 12-2 and camera 11-2," and between "reader 12-3 and camera 11-5;" for example, in FIG. 3, a person with detected metadata duplicate with respect to the time can be tied as the same person.

Upon reception of the passage information of the person and the face feature data of the person, the meta classification section 101 stores the information and the data in the database 15 as high accuracy metadata; upon reception of the color/shape feature data of the person, the meta classification section 101 stores the information and the data in the database 16 as low accuracy metadata. The metadata is thus classified and stored in the database 15 or 16, whereby it is made possible to first extract discontinuous passage points with respect to the time, of the person to be retrieved from the passage information of the person and at the same time, also extract the face feature data tied to the extracted passage points in the discrete retrieval section 103 and next extract a similar person from the cameras 11-1 to 11-5 using the color/shape feature data tied to the extracted face feature data as a key in the discrete candidate-to-candidate retrieval section 106, and it is made possible to switch a plurality of pieces of metadata and investigate the behavior history of the person to be retrieved.

<Meta Classification Pattern B>

In addition to the name of the person 20, the face feature data is held in the readers 12-1 to 12-3 and when the passage of the person 20 is detected, passage information "name, face feature data, time, reader name (location)" is output as metadata. The cameras 11-1 to 11-5 are installed as cameras capable of detecting at least one of the face feature data of the person 20 and the color/shape feature data of the dress and when the person is detected, person feature data "face feature data (which may be undetected), color/shape feature data of dress (which may be undetected), time, camera name (location)" is output as metadata.

Upon reception of the passage information of the person 20, the meta classification section 101 stores the information in the database 15 as high accuracy metadata; upon reception of the feature data of the person 20, the meta classification section 101 stores the data in the database 16 as low accuracy metadata. The databases 15 and 16 can be tied using the face feature data given to the passage information and as the discrete retrieval section 103 is called retrieval means aimed at the readers 12-1 to 12-3 and the discrete candidate-to-candidate retrieval section 106 is called retrieval means aimed at the cameras 11-1 to 11-5, it is made possible to facilitate the relationship between each retrieval means and each of the readers/cameras.

<Meta Classification Pattern C>

The cameras 11-1 to 11-5 are installed as cameras capable of detecting at least one of the face feature data of the person 20 and the color/shape feature data of the dress and when the person is detected, person feature data "face feature data (which may be undetected), color/shape feature data of dress (which may be undetected), time, camera name (location)" is output as metadata. The readers 12-1 to 12-3 are not used.

Upon reception of the passage information of the person 20, the meta classification section 101 stores the information in the database 15 as high accuracy metadata; upon reception of the color/shape feature data of the person, the meta classification section 101 stores the data in the database 16 as low accuracy metadata. The databases 15 and 16 can be tied using "time, camera name (location)" as "time, camera name (location)" is called the same face feature data and color/shape feature data, and if the readers 12-1 to 12-3 do not exist, namely, if the cameras 11-1 to 11-5 only exist, the behavior history retrieval apparatus of the invention can be used.

Figure 5:
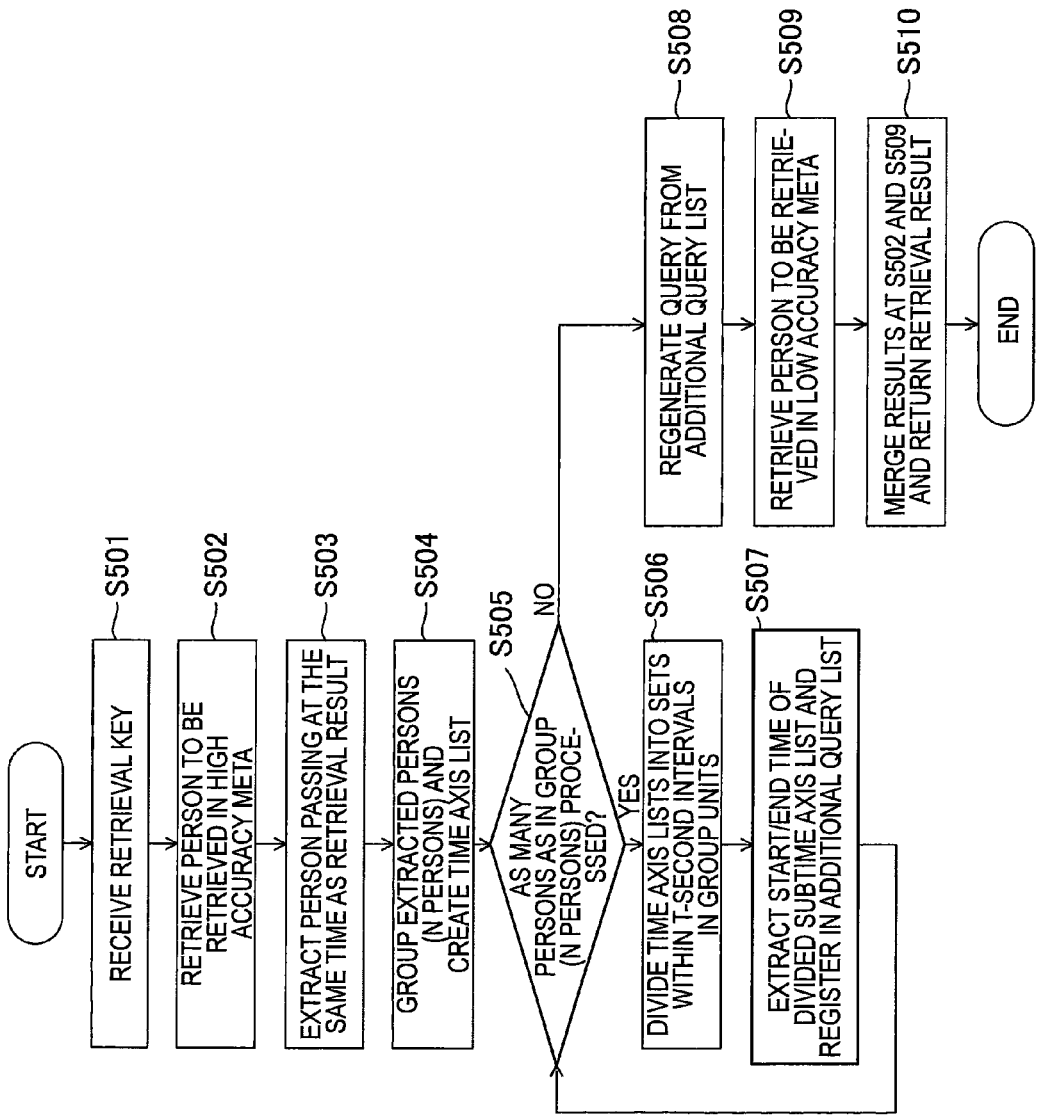
FIG. 5 is a flowchart to describe the retrieval operation of the behavior history retrieval apparatus according to embodiment 1 of the invention.

FIG. 5 is a flowchart to show a processing procedure of the retrieval request reception section 102, the discrete retrieval section 103, the dependence determination section 104, the query generation section 105, and the discrete candidate-to-candidate retrieval section 106. The operation will be discussed below with reference to the flowchart of FIG. 5:

To begin with, the retrieval request reception section 102 receives the retrieval key of the person to be retrieved (step S501). The received retrieval key is an identifier for classifying the metadata stored in the high accuracy database 15; for example, it is the "name" of the person to be retrieved in "meta classification pattern A, B" or is the "face feature data" of the person to be retrieved in "meta classification pattern C."

Next, the discrete retrieval section 103 retrieves the person to be retrieved in the high accuracy database 15 and acquires the applied retrieval result (step S502).

Next, the dependence determination section 104 extracts the person passing at the same time as the person to be retrieved from the high accuracy database 15 using information of "time, reader name (location)" contained in each retrieval result for a plurality of retrieval results acquired in step S502 (step S503). For example, in FIG. 2, assuming that the discrete retrieval result of "person to be retrieved 20=Yamada" is "time=15:00, reader name=reader 12-1" and "time=15:15, reader name=reader 12-3," information indicating that the persons passing at the same time as Yamada are "time=15:00, reader name=reader 12-1, name=Yamamoto," "time=15:00, reader name=reader 12-1, name=Yamashita," and "time=15:15, reader name=reader 12-1, name=Yamamoto" is acquired.

Next, the dependence determination section 104 creates move path information (time axis list) in person units using identifiers for classifying persons such as the name/face feature data, etc., from the extraction result at step 503 (step S504). In the example of step S503, time axis lists of two persons of "name=Yamamoto, (time=15:00, reader name=reader 12-1)->(time=15:15, reader name=reader 12-1)," "name=Yamashita, (time=15:00, reader name=reader 12-1)" are created.

Next, the dependence determination section 104 executes steps S506 and S507 for as many time axis lists as the number of persons, created at step S504 (step S505).

Next, subtime axis lists are created so that the time axis list of each person becomes a time axis list within a predetermined time interval T seconds (step S506). For example, assuming that time interval=300 seconds in FIG. 6, the time axis list of person D is created as two subtime axis lists of "first passage information and second passage information" and "seventh passage information." Since person B and person C cannot be divided, "subtime axis list=time axis list." In FIG. 6, readers (0), (1), (2), (3), (4), (5), and (6) are similar to the readers 12-1 to 1203 in FIG. 2. Others are also similar.

Next, the start/end time of each divided subtime axis list is extracted and is registered in an additional query list (step S507). For example, four additional query lists are created as in FIG. 7. Next, the query generation section 105 regenerates queries from the additional query lists (step S508). The generated query becomes person identifier="identifier of person to be retrieved OR identifiers of dependence persons (persons created in step S504)," retrieval range="time, location;" in fact, however, duplicate time periods and dependence persons between elements of additional query list are extracted and the person identifier and the retrieval range described above are set as in FIG. 8.

Next, the discrete candidate-to-candidate retrieval section 106 retrieves the person to be retrieved in the low accuracy database 16 (step S509). The results obtained at steps S502 and S509 are merged and the retrieval result is returned (step S510).

FIG. 9 schematically shows a processing image of the dependence determination section 104 for automatically determining that a person moving in a pair with the person to be retrieved for a given time or a person in the same move tendency as the person to be retrieved for a given time is the dependence person. In FIG. 9, if a person in the same move tendency as Yamada of the person to be retrieved is detected, Yamamoto becomes a dependence person both "reader 12-1<->reader 12-2" and "reader 12-2<->reader 12-3" and thus the retrieval query at the time of discrete candidate-to-candidate retrieval aimed at the camera becomes "face feature data (or color feature data) of Yamada OR Yamamoto." The query is used for retrieval, whereby it is made possible to extract a behavior history of Yamada in a time period in which Yamada is in the shade of Yamamoto (91 in FIG. 9) or in a time period in which Yamada is in the shade of an obstacle (92 in FIG. 9), for example.

Thus, according to the behavior history retrieval apparatus according to the embodiment, individual identifiable accuracy is assigned to the feature data of a person extracted from camera images of the cameras 11 and the passage information of a person detected through the readers 12 and first a person having a dependence on the person to be retrieved is automatically determined from high accuracy information and next the identifier of the dependence person is given to low accuracy information and retrieval is executed, whereby the behavior history can also be investigated in a time period in which a part of the person to be retrieved is hidden in a blind spot or in the shade of another person. Particularly, a person moving in a pair with the person to be retrieved for a given time is determined the dependence person, whereby the behavior history can also be investigated if a part of the person to be retrieved is hidden in a blind spot or in the shade of another person in a time period in which the person to be retrieved is together with a visitor, a companion, a parent, etc.

As the classification method of the meta classification section 101, the metadata used in the apparatus (person passage information, person feature data) may be classified into a plurality of degrees of accuracy in the descending order of authentication accuracy (false non-match rate, false acceptance rate). In so doing, high accuracy metadata can be automatically set in response to the camera installation condition and the presence or absence of a reader; for example, in a system using no reader, the person feature data of a face can be set in high accuracy metadata for executing discrete retrieval or if a reader is used, the person feature data of a face and the person passage information can be set in high accuracy metadata for increasing the number of candidates hit in discrete retrieval.

Embodiment 2

A behavior history retrieval apparatus according to embodiment 2 of the invention can investigate a behavior history if a part of the person to be retrieved is hidden in a blind spot or in the shade of another person while the person to be retrieved is moving. The configuration of the behavior history retrieval apparatus according to embodiment 2 is roughly the same as the configuration of the behavior history retrieval apparatus according to embodiment 1 described above and therefore only processing procedures of a dependence determination section 104, a query generation section 105, and a discrete candidate-to-candidate retrieval section 106 different from those of the behavior history retrieval apparatus according to embodiment 1 will be discussed.

Figure 10:
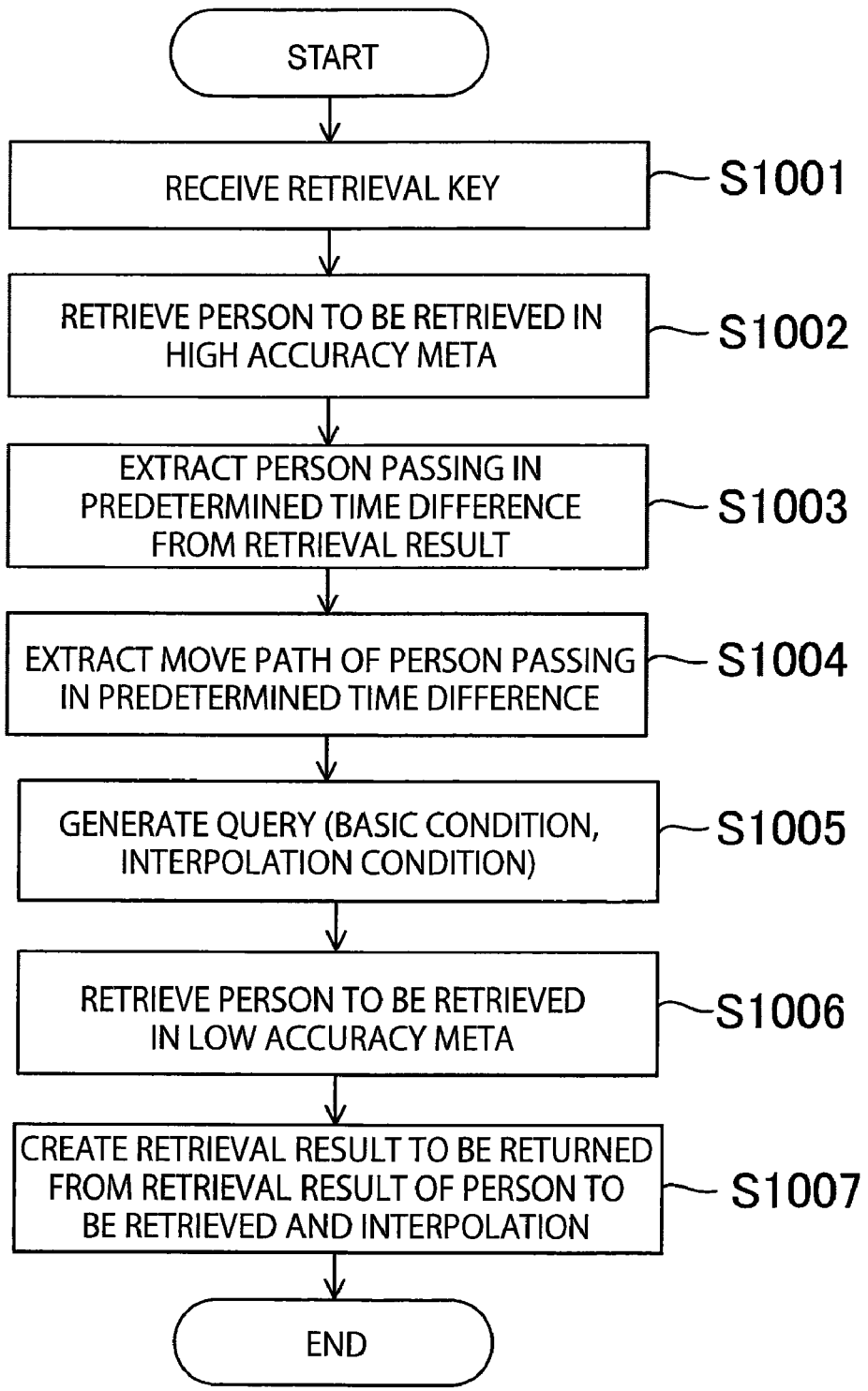
FIG. 10 is a flowchart to describe the retrieval operation of a behavior history retrieval apparatus according to embodiment 2 of the invention.

FIG. 10 is a flowchart to show the processing procedures of the dependence determination section 104, the query generation section 105, and the discrete candidate-to-candidate retrieval section 106. The operation will be discussed below with reference to the flowchart of FIG. 10:

To begin with, the retrieval key of the person to be retrieved is received as at step S501 (step S1001). Next, the person to be retrieved is retrieved in a high accuracy database 15 and the applied retrieval result is acquired (step S1002).

Next, the dependence determination section 104 extracts a person passing in a predetermined time difference from the person to be retrieved from the high accuracy database 15 using information of "time t, reader name (location)" contained in each retrieval result for a plurality of retrieval results obtained at step S1002 (step S1003). The time of the predetermined time difference is set as "t±α" (α: A plurality of a are set like 5 seconds, 10 seconds, 15 seconds . . . ). For example, in FIG. 2, if the discrete retrieval result of "person to be retrieved 20=Yamada" become "time=15:00, reader name=reader 12-1" and "time=15:15, reader name=reader 12-3," the retrieval condition at step S1003 becomes "(time=15:00+5 seconds and reader name=reader 12-1) and (time=15:15+5 seconds and reader name=reader 12-3)" or "(time=15:00−5 seconds and reader name=reader 12-1) and (time=15:15−5 seconds and reader name=reader 12-3)" or "(time=15:00+10 seconds and reader name=reader 12-1) and (time=15:15+10 seconds and reader name=reader 12-3)" or . . . and the person meeting the retrieval condition is retrieved.

Next, the dependence determination section 104 retrieves the move path of each person of the person group extracted at step 1003 (person group passing in the predetermined time difference) using the low accuracy database 16 (step S1004). The retrieval condition of each person is person identifier="person passing in predetermined time difference," retrieval range="time, location" and "OR" of "time range, location" between the discrete candidates of the retrieval result group (discrete candidate group) extracted at step S1002 is specified as the condition of "time, location."

Next, the query generation section 105 sets the condition (basic condition) for retrieving the person to be retrieved 20 from the low accuracy database 16 and the move path information (interpolation condition) of the person group passing in the predetermined time difference as a query (step S1005). Person identifier="person to be retrieved," retrieval range="time, location" (the details of time, location are similar to those at step S1004) is specified as the basic condition.

Next, the discrete candidate-to-candidate retrieval section 106 retrieves the person to be retrieved using the basic condition (step S1006). Next, the discrete candidate-to-candidate retrieval section 106 makes a comparison between "the move path of the person to be retrieved, obtained at step S1006" and "the move path of the person (dependence person) passing in the predetermined time difference of the interpolation condition" and selects the dependence person most resembling the person to be retrieved in move path (assuming that the dependence person is person A) (step S1007). As for the time period interrupted in the move path of the person to be retrieved, interpolating processing from the move path of the person A is performed and the result is returned as the retrieval result.

Thus, according to the behavior history retrieval apparatus according to the embodiment, the person passing in the predetermined time difference from the person to be retrieved is extracted from the high accuracy database and the person in the same move tendency as the person to be retrieved for a given time is determined the dependence person, so that if a part of the person to be retrieved is hidden in a blind spot or in the shade of another person while the person to be retrieved is moving alone, a behavior history can be investigated.

In FIG. 10, the method of specifying only the person passing through all passage points of the person to be retrieved obtained in the discrete retrieval section 103 in the interpolation condition has been described. However, a person passing through continuous partial passage points (partial passage points) rather than all passage points is also added to the interpolation condition and interpolation processing at the partial passage points is performed, whereby the behavior history extraction accuracy of the person to be retrieved can be further enhanced.

Embodiment 3

A behavior history retrieval apparatus according to embodiment 3 of the invention can enhance the retrieval hit rate at the time of discrete candidate retrieval and shorten the whole processing time. The configuration of the behavior history retrieval apparatus according to embodiment 3 is roughly the same as the configuration of the behavior history retrieval apparatus according to embodiment 1 described above and therefore only processing procedures of a meta classification section 101 and a discrete candidate-to-candidate retrieval section 106 different from those of the behavior history retrieval apparatus according to embodiment 1 will be discussed.

Figure 12:
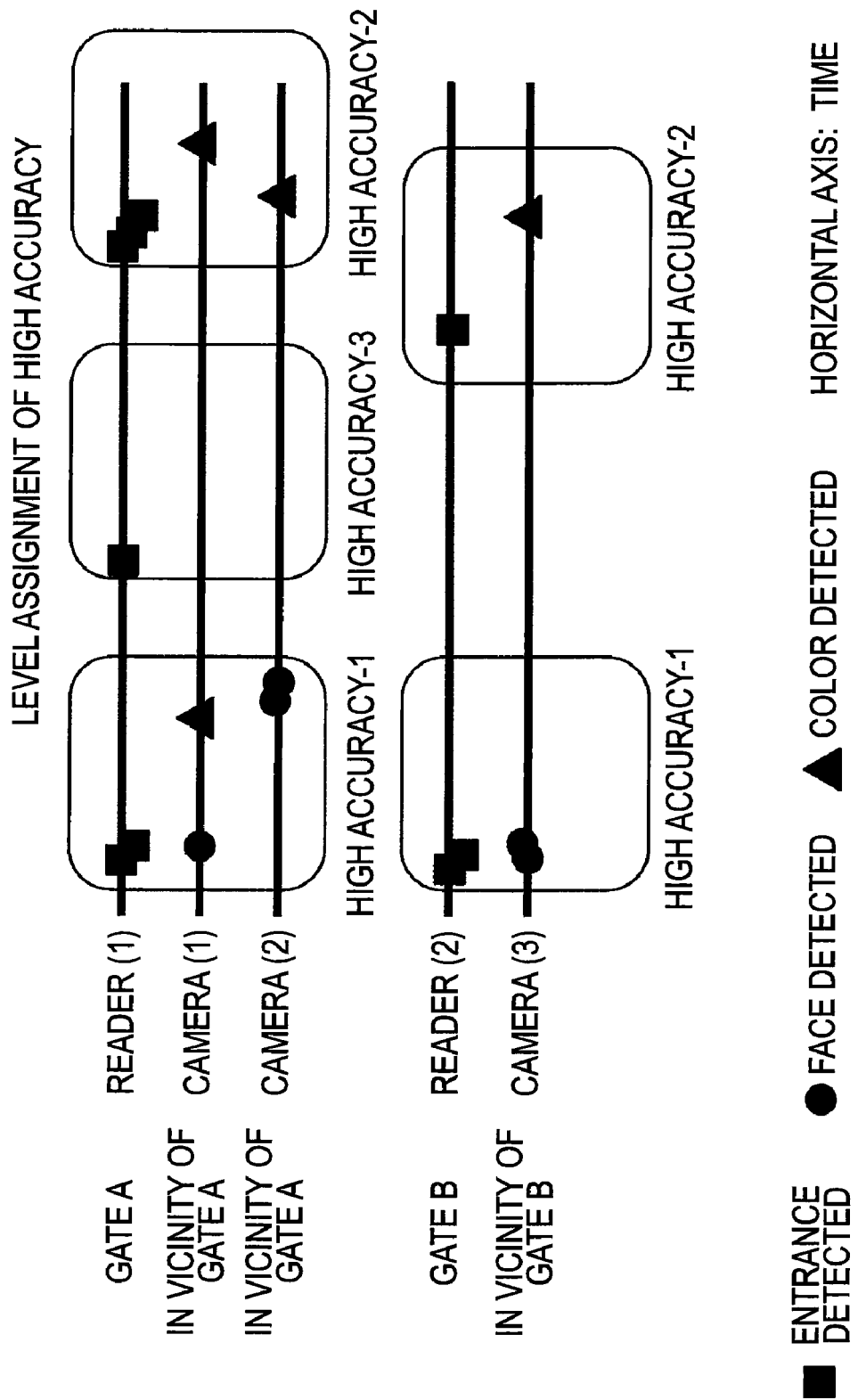
FIG. 12 is a drawing to describe meta classification of the behavior history retrieval apparatus according to embodiment 3.
Figure 13:
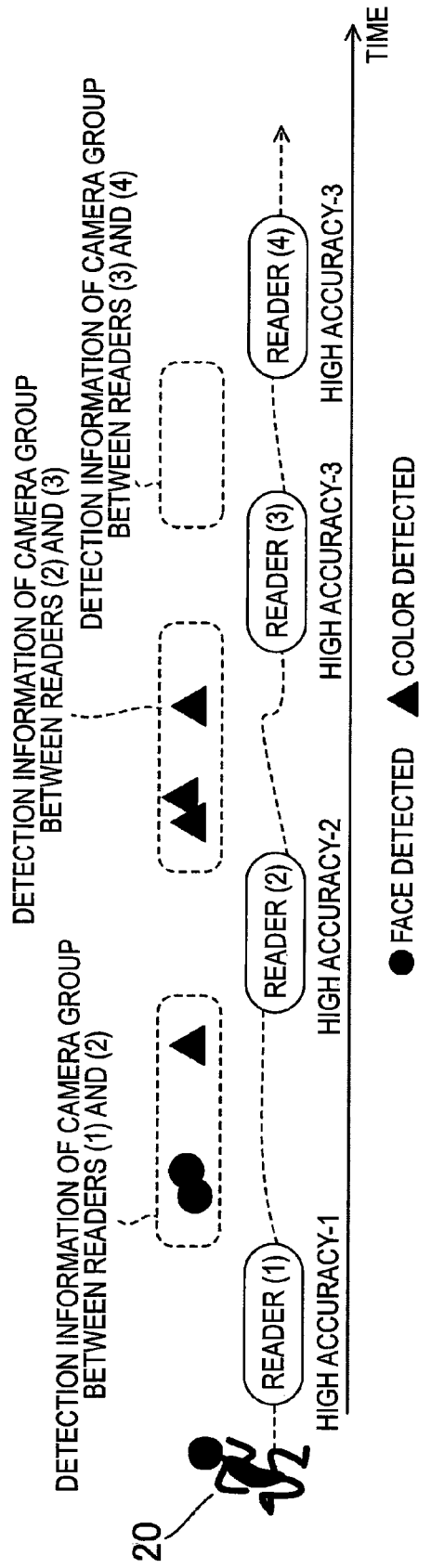
FIG. 13 is a drawing to describe meta classification of the behavior history retrieval apparatus according to embodiment 3.

FIGS. 11 to 13 show a method of subdividing the level of metadata stored in a high accuracy database 15 in response to the association with any other metadata stored in a low accuracy database 16 in the meta classification section 101. As in FIG. 11, the level of high accuracy metadata (1, 2, 3) is previously defined in the system; for example, "high accuracy metadata=reader for entrance and exit" is assigned a high accuracy level like "level of reader detecting a face in T seconds after entrance=1," "level of reader detecting a color in T seconds after entrance=2," and "level of reader detecting nothing in T seconds after entrance=3."

FIG. 12 shows which level the detected high accuracy metadata is to be classified into. For example, if person feature data is not output from camera (1) or (2) in the vicinity of gate A within a predetermined time after reader (1) at the gate A operates, the level of person passage information output from the reader (1) is set to high accuracy-3 and is registered in the database 15. If face feature data and color feature data are output as person feature data from the cameras (1) and (2) in the vicinity of the gate A within a predetermined time after the reader (1) at the gate A operates, the level of person passage information output from the reader (1) is set to high accuracy-1 (higher level of face, color) and is registered in the database 15.

FIG. 13 schematically shows high accuracy levels of metadata detected in the readers (1) to (4) and detection information of a camera group between the readers. In this case, the retrieval procedure at the time of discrete candidate retrieval is to retrieve person feature data at the high accuracy level or less in such a manner that "between readers (1) and (2): Face feature data is retrieved and then color feature data is retrieved," "between readers (2) and (3): Color feature data is retrieved," and "between readers (3) and (4): Nothing is retrieved" in response to the high accuracy level. Thus, the high accuracy level is assigned and the retrieval processing is changed in response to the level, so that the retrieval processing can be speeded up and particularly a higher level is assigned to metadata involving a larger matching and collation computation amount, so that the whole retrieval processing can be enhanced.

Thus, according to the behavior history retrieval apparatus according to the embodiment, the level of high accuracy metadata is subdivided in response to the association with any other metadata and the metadata corresponding to the subdivided level is specified at the retrieval condition specifying time of discrete candidate-to-candidate retrieval, so that the retrieval hit rate at the time of discrete candidate retrieval can be enhanced and the whole processing time can be shortened.

While the invention has been described in detail with reference to the specific embodiments, it will be obvious to those skilled in the art that various changes and modifications can be made without departing from the spirit and the scope of the invention.

This application is based on Japanese Patent Application (No. 2007-038145) filed on Feb. 19, 2007, which is incorporated herein by reference.

INDUSTRIAL APPLICABILITY

Since the person having a dependence on the person to be retrieved can be automatically determined and can be given to a retrieval quest for executing retrieval, the invention has the advantage that the behavior history can also be investigated in a time period in which a part of the person to be retrieved is hidden in a blind spot or in the shade of another person; the invention can also be applied to the use of viewing, retrieving, and editing the privately photographed content (still image, moving image) such as a trip or a field day in addition to the monitor use of keeping track of all behavior of a shoplifter, a lost person, or a person losing an article aimed at a plurality of cameras.

The invention claimed is:

1. A behavior history retrieval apparatus that extracts a behavior history of a specific person, comprising:
   a plurality of cameras for extracting features containing at least one of face, color, and shape of a person;
   at least one reader for detecting passage of the person;
   a plurality of databases which respectively store information in accordance with different degrees of accuracy for identifying an individual;
   a meta classification unit which assigns an accuracy level to person feature information of the person extracted from the cameras and to passage information of the person detected through the at least one reader and stores the person feature information and the passage information in databases, of the plurality of databases, corresponding to respectively assigned accuracy levels;
   a retrieval request reception unit which receives an identifier for identifying a person to be retrieved at least as a first retrieval key;
   a discrete retrieval unit which retrieves the person corresponding to the first retrieval key received by the retrieval request reception unit in a high accuracy database of the plurality of databases;
   a dependence determination unit which determines a person having a dependence on the person to be retrieved using a plurality of retrieval results hit by the discrete retrieval unit in the high accuracy database;
   a query generation unit which generates a second retrieval key based on an identifier of the person having the dependence, determined by the dependence determination unit, and the first retrieval key; and
   a discrete candidate-to-candidate retrieval unit which retrieves persons corresponding to the second retrieval key, generated by the query generation unit, in a low accuracy database of the plurality of databases.

2. The behavior history retrieval apparatus according to claim 1, wherein the meta classification unit classifies metadata of the person feature information and the person passage information into a plurality of accuracy levels in a descending order of authentication accuracy of a false non-match rate and a false acceptance rate and generates metadata for each accuracy level.

3. The behavior history retrieval apparatus according to claim 2, wherein the meta classification unit subdivides a level of the metadata, which is classified into the high accuracy database, in response to the association with any other metadata, and specifies the metadata corresponding to the subdivided level at the time of specifying retrieval condition of discrete candidate-to-candidate retrieval.

4. The behavior history retrieval apparatus according to claim 2, wherein the discrete candidate-to-candidate retrieval unit repeatedly executes discrete candidate-to-candidate retrieval in order from the high accuracy database.

5. The behavior history retrieval apparatus according to claim 1, wherein the dependence determination unit extracts the person passing at the same time as the person to be retrieved, from the high accuracy database, and determines that a person moving in a pair with the person to be retrieved for a given time is the dependence person.

6. The behavior history retrieval apparatus according to claim 1, wherein the dependence determination unit extracts a person passing in a predetermined time difference from the person to be retrieved, from the high accuracy database, and determines that a person in the same move tendency as the person to be retrieved for a given time is the dependence person.

7. A behavior history retrieval method comprising:
   extracting, by a plurality of cameras, person feature information containing at least one of face, color, and shape of a person;
   detecting passage of the person, by at least one reader, and generating person passage information;
   assigning an accuracy level to the person feature information and to the person passage information, and storing the person feature information and the person passage information in databases, of a plurality of databases, respectively corresponding to the assigned accuracy levels;
   first retrieving a person to be retrieved in a high accuracy database of the plurality of databases by utilizing a first retrieval key corresponding to an identifier of the person to be retrieved;
   determining a person having a dependence on the person to be retrieved using a plurality of retrieval results hit in the high accuracy database;
   generating a second retrieval key based on an identifier of the person having a dependence and the first retrieval key; and
   second retrieving persons corresponding to the second retrieval key in a low accuracy database of the plurality of databases.

8. The behavior history retrieval method according to claim 7, wherein in assigning the degree of accuracy, the metadata of the person feature information and the person passage information is classified into a plurality of degrees of accuracy in a descending order of authentication accuracy of a false non-match rate and a false acceptance rate, and metadata is generated for each degree of accuracy.

9. The behavior history retrieval method according to claim 8, wherein in the assigning step, the level of the high accuracy metadata is subdivided in response to the association with any other metadata and the metadata corresponding to the subdivided level is specified at the time of specifying retrieval condition of discrete candidate-to-candidate retrieval.

10. The behavior history retrieval method according to claim 8, wherein in the second retrieving step, repeatedly executes discrete candidate-to-candidate retrieval in order from the high accuracy database.

11. The behavior history retrieval method according to claim 7, wherein in the determining step, the person passing at the same time as the person to be retrieved is extracted from the high accuracy metadata, and a person moving in a pair with the person to be retrieved for a given time is determined the dependence person.

12. The behavior history retrieval method according to claim 7, wherein in the determining step, a person passing in a predetermined time difference from the person to be retrieved is extracted from the high accuracy metadata, and a person in the same move tendency as the person to be retrieved for a given time is determined the dependence person.

* * * * *